Jan. 14, 1964  G. CAMERINI  3,117,711
PLASTIC BAG

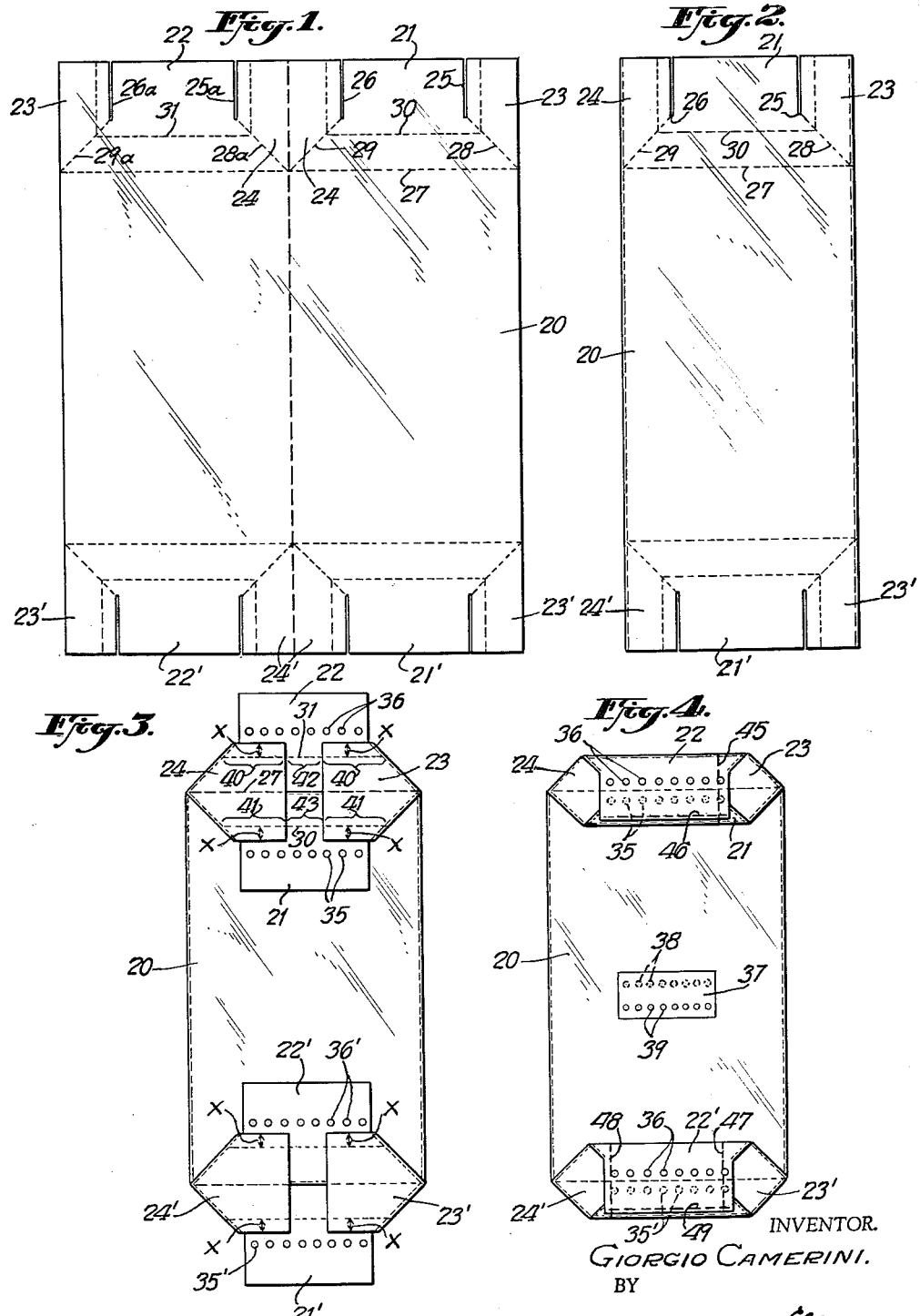

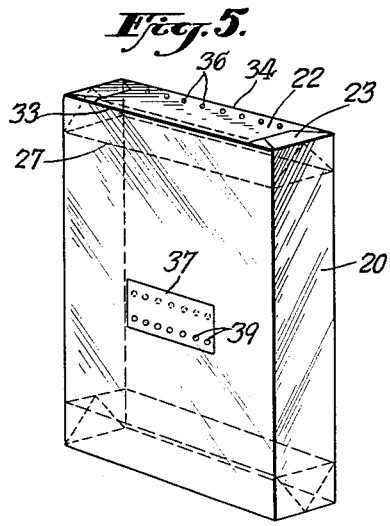
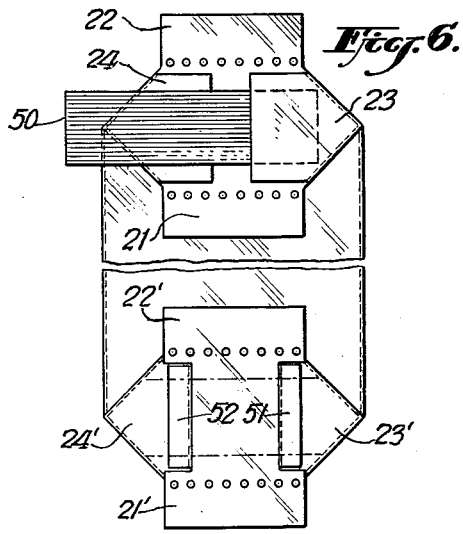
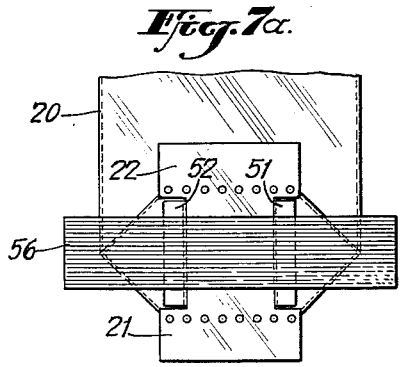
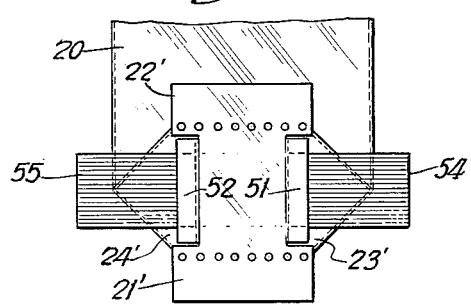
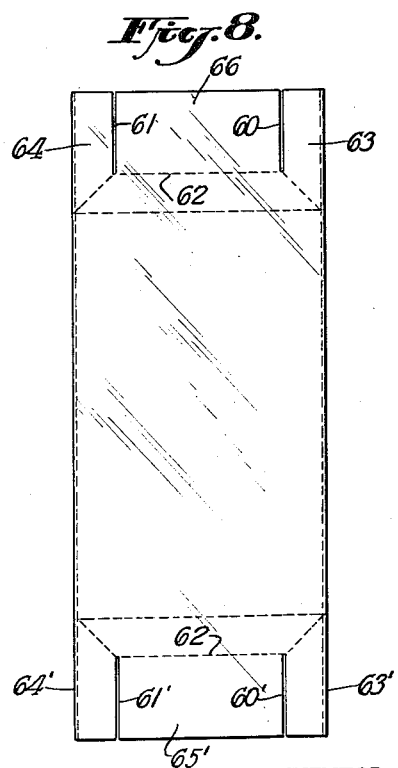

Filed May 23, 1961  4 Sheets-Sheet 3

INVENTOR.
GIORGIO CAMERINI.
BY
Ward, Neal, Haselton, Orme + McClannon
ATTORNEYS.

Jan. 14, 1964 G. CAMERINI 3,117,711
PLASTIC BAG
Filed May 23, 1961 4 Sheets-Sheet 4
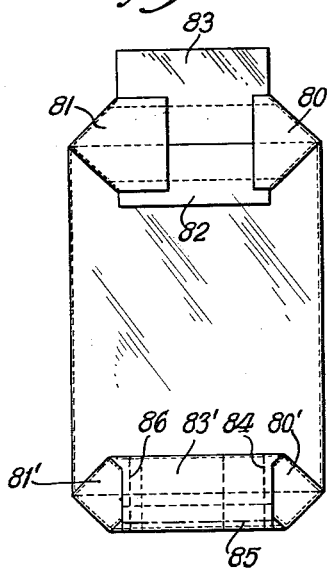
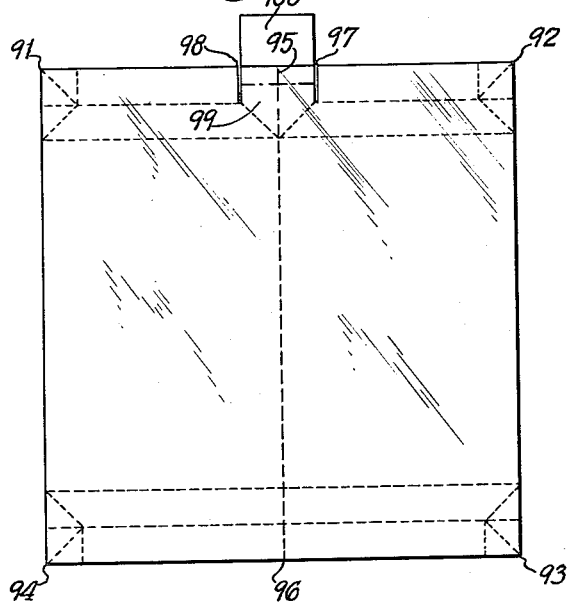
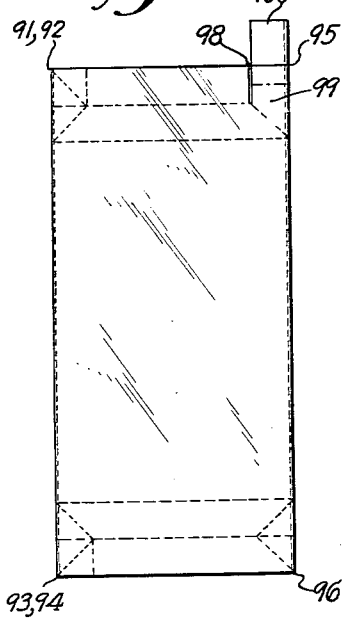
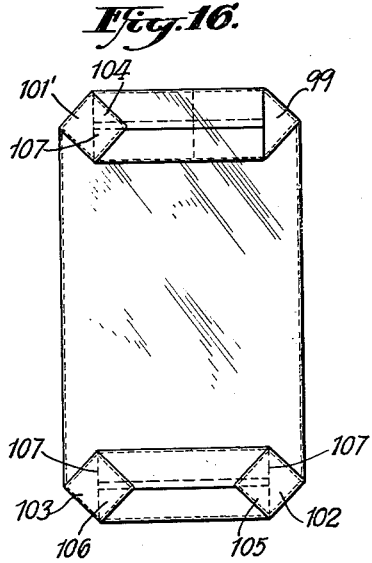
INVENTOR.
GIORGIO CAMERINI.
BY
Ward, Neal, Haselton, Orme & McElhannon
ATTORNEYS.

United States Patent Office 3,117,711
Patented Jan. 14, 1964

3,117,711
PLASTIC BAG
Giorgio Camerini, Milan, Italy, assignor to Natro-Cellulosa, S.p.A., Milan, Italy, a corporation of Italy
Filed May 23, 1961, Ser. No. 111,971
Claims priority, application Italy May 30, 1960
3 Claims. (Cl. 229—57)

This invention relates to bags, and methods for making same, of types formed of plastic sheet material and more particularly to such bags adapted for use as shipping sacks and including among others, valve bags of such types adapted for the automatic packaging of granular and powdered materials.

Bags formed of plastic sheet material have heretofore been available and have generally been made by using a flattened tubular length of the plastic sheet material with the opposed wall edge portions at each end secured together by heat sealing, pasting or other means, such tube lengths being obtained by transversely cutting a continuous tube of the plastic sheet material. With such bags, one corner portion may be folded inwardly to provide a flap of a valve for permitting automatic filling of the bag, such valve flap being provided, if desired, with a sleeve or extension for facilitating closure of the valve.

Such conventional bags which are sometimes referred to as having a "pinch bottom" type of closure, will assume an expanded pillow shape when filled and for this reason same cannot readily or securely be piled one on top of another in large numbers, inasmuch as they will tend easily to slide out of position. Furthermore, plastic bags having end closures such as above referred to, are not sufficiently durable for heavy use inasmuch as the closure portions are not adequately reinforced and thus when same are subjected to heavy pressure or stresses in use, the end portions and valve region may tear open or otherwise fail.

The present invention makes it possible to provide bags of plastic sheet material and particularly bags of a single walled valve type and which are free of defects such as above referred to.

In the manufacture of bags or shipping sacks of paper, it has been the common practice to provide end closures therefor in the form of side and corner closure flaps which are folded into superposed relation and pasted in place, but so far as is known, it has not heretofore been appreciated that bags formed of plastic sheet material could have end closures satisfactorily formed of such flaps, and it has not been apparent how such flaps could satisfactorily be secured by heat sealing or otherwise in such manner as to provide a durable and effectively siftproof end closure. But in accordance with the present invention, a plastic bag, preferably of the single-walled valve type, is made possible, having end closures formed of superposed corner and side flaps and which are secured in place preferably by novel methods and arrangements of heat sealing so as to provide such bags with effectively reinforced and highly durable end structures which will not become torn apart or permit leakage during heavy use. As a result, plastic bags, including valve bags, may be provided in accordance with the invention and which when filled will retain a generally parallepiped shape convenient for handling, stacking and shipment and with the end closures so effectively reinforced that they will remain sealed even when the filled bags are subjected to heavy pressure.

Various further and more specific objects, features and advantages of the invention will appear from the description given below, taken in connection with the accompanying drawings, illustrating by way of example preferred forms of the invention.

In the drawings:

FIG. 1 is a developed view of a plastic bag blank in accordance with one embodiment of the invention;

FIG. 2 is a view of the same plastic bag blank in condition ready for formation of the end closures;

FIG. 3 is a further view of the same form of bag blank showing the condition of the closure flaps therefor during an intermediate stage in the manufacture of the bag;

FIG. 4 is a view of the finished bag while in flat empty condition;

FIG. 5 is a perspective view of the same embodiment of the invention, in filled condition;

FIG. 6 is another view showing the positions and condition of various parts of the bag closures during intermediate stages in the manufacture of the bag and the heat sealing of the end closures thereof;

FIGS. 7a and 7b illustrate bottom or end closure portions of the bag during two alternative intermediate stages in the heat sealing thereof;

FIGS. 8 and 9 are views similar to FIGS. 2 and 3 but showing a somewhat different embodiment;

FIGS. 12 and 13 are also similar views showing a still further embodiment; and

FIGS. 14, 15 and 16 are views similar to FIGS. 1, 2 and 4 but showing yet another modification.

Figure 9:
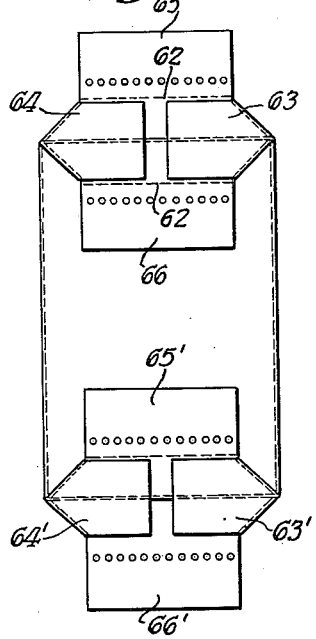

Referring now to FIGS. 1-4 inclusive in further detail, the plastic bag embodiment shown comprises a tubular body portion 20 formed of a length of plastic tubular sheet material such as of polystyrenes or other and preferably readily heat-sealable plastic material. Such tubular plastic material may be formed by methods and means disclosed for example in U.S. Patents Nos. 2,461,975 and 2,844,846. As shown in the latter of said patents, such tubing may be provided along its sides with gusset formations so that if desired the bags formed thereof may have gussets along their sides, although the example of FIGS. 1-4 is ungusseted. It will be apparent also that the bags or bag blanks of these figures might be formed from flat non-tubular plastic sheet material, in which event lengths thereof would be folded over along a longitudinal fold line and the side edges heat sealed together to form a tube.

As best shown in FIG. 3, the upper end closure for the plastic bag may be comprised of four closure flaps, viz. a side flap 21, which in the finished bag will be a side flap which underlies an overlying side flap 22. Corner flaps 23 and 24 are provided which are folded inwardly of the bag to underlie both of the side flaps 21 and 22. In the usual case, in order to separate the side flaps from the corner flaps of the plastic tubing, the front wall of the bag blank, as shown in FIG. 2, is provided with slits as at 25, 26 extending longitudinally of the bag tube, the rear wall as shown in the developed view of FIG. 1 being also formed with corresponding slits 25a and 26a.

In shaping the end closure, the upper end of the bag blank, as shown in FIG. 2, may be folded forwardly about a fold line 27 and at that time the side flaps 21, 22 may be extended to positions flatwise of the bag, as shown in FIG. 3, while the corner flaps 23, 24 become folded inwardly and flatwise of the bag. The outer edge portions of the corner flaps will become folded along diagonal fold lines as indicated at 28, 29, 28a, 29a in FIG. 2 and in the developed view of FIG. 1, these fold lines defining the outwardly directed edge portions of the corner flaps 23, 24 as they appear in FIG. 3.

The side flaps 21 and 22 respectively are adapted to be folded over into final position about so-called base fold lines as indicated at 30, 31 in various of the figures. FIG. 4 shows the positions of the various flaps after they have been folded into final position.

As best shown in FIG. 3, it will be noted that the longitudinal side edge portions of the corner flaps 23 and 24 are so positioned and formed that they will extend out at each side of the flap beyond the base fold lines 30, 31, by a distance indicated by the arrows at $x$. Thus when the side flaps 21 and 22 are folded in to final position, these marginal side edge portions of the corner flaps will also be folded over and inwardly along the base fold lines. It will be noted that the slits above referred to stop short of the base fold lines, that is the ends of the slits terminate approximately at the side edges of the corner flaps so that the marginal side edges of the corner flaps are free of slits.

In the form shown in FIGS. 1–4, the profiling of the lower end closure parts may be the same as for those above described for the upper end closure and same are indicated by the same reference numbers on the drawings, but accompanied by prime marks. However, as hereinafter explained, one end closure or the other of the bag, upon being sealed, will be left with a valve opening for example at the top corner, or, if desired, at both top corners in case it is desired to use the bag with filling machines having two filling spouts for concurrently and more rapidly filling the bag by material introduced through both top corners.

After the bag end closures are sealed and the bag is filled, it will assume a generally parallelepiped shape such as indicated in FIG. 5. Although along the corners or edges of each wall panel the bag may be more or less rounded, yet the main or larger side wall surfaces will be so nearly flat that numerous of the bags may be readily stacked in position flatwise one upon another without liability of slipping out of place and without causing undue pressure to be applied to the contents in any region within the bag. While it will be apparent that the end closures of the bag when initially sealed are flatwise of the bag when empty as shown in FIG. 4, yet after the bag is filled the top and bottom end closure portions will assume positions normal to the side walls of the bag and furthermore these end closure regions will be heavily reinforced because the greater part thereof will be comprised of at least two thicknesses of the plastic sheet material. It is further noted that because of the fact that the marginal side portions of the corner flaps extend beyond the base fold lines, by the distances $x$ as indicated in FIG. 3, the result will be that a greater part of the corner lines as at 33, 34 will be exceptionally strong in that same will be comprised of the thickness of portions of the side flaps plus the thickness of the marginal portions indicated at $x$, and furthermore as hereinafter explained, these portions will be substantially integrally heat sealed together further contributing to the strength desirable at these regions.

As further shown in FIGS. 3–5 inclusive, numerous small holes or perforations are provided to allow air to escape during filling of the bag so that the bag will not become inflated, thereby eliminating all the troubles which might otherwise occur due to the characteristic impermeability of the plastic sheet material of which the bag is formed. These perforations, which are shown in the drawings as somewhat exaggerated in size, are preferably so arranged as to provide labyrinth seals at the regions where same occur. For example, on side flap 21, a row of perforations may be provided as at 35 and on side flap 22 another row is provided at 36 along a line which, as shown in FIG. 4, will be offset with respect to the perforations 35 when the flaps are in closed condition. To further provide for venting of the bag during filling, if desired, a patch as at 37 may be applied to the side wall of the bag and heat sealed thereto about its periphery and serving to cover a row of perforations 38 in the bag wall, the patch in turn having a row of perforations 39 offset with respect to those at 38 to provide the desired labyrinth seal.

The preferred method and means for sealing the end closure flaps will now be described. First it is desirable to heat seal the marginal side portions of the side flaps indicated at $x$ in FIG. 3, on the undersurfaces thereof, to the surface on the inside of flaps 21 and 22 which contact therewith. This may be accomplished by placing the regions of each of the base fold lines 30 and 31 between the electrodes for example of a suitable known form of dielectric heat sealing apparatus. That is, one elongated electrode would be placed along beneath the region of the base fold line as at 31 and the other along the region on top of such line so that the plastic dielectric sheet material therebetween will become heated and the contacting portions thereof thus sealed together. Similarly, electrodes may be applied along base fold line 30 for heat sealing the marginal portions of the corner flaps there to the surface of the side flap 21 thereunder. In other words, the side margins of the corner flaps will be thus heat sealed to the side flaps along those portions of the dotted lines indicated at 40 and 41. Thus by these heat seals, the entire end closure will be securely sealed except along that portion of the dotted lines indicated at 42, 43, but these portions as hereinafter explained will be covered and sealed when the side flaps are folded over and sealed. Also the same heat sealing electrodes as above referred to when applied may be utilized to serve the purpose of simultaneously applying heat marking lines to the plastic. That is, the portions of the base fold lines indicated at 42 and 43 in FIG. 3 will be heat marked so that, together with the lines of heat sealing at 40, 41, same will provide defined lines about which the side flaps 21, 22 are to be folded over into overlapping relation, and these defined lines will further contribute to the formation of defined shoulders for the end closure of the bag, tending to cause same to assume its desired box-like shape.

It will be understood that the lower closure end of the bag in FIG. 3 may be treated and sealed in the same manner as above described for the upper end closure.

In order to complete the end closures, the side flap 21 is folded over and the side flap 22 is folded over in superposed relation to flap 21, and if for example the valve is to be located at corner flap 24, then the overlying side flaps may be pasted or otherwise secured together and to the corner flap 23 thereunder by bands or lines of adhesive located at the position indicated by the dotted line 45 at the upper end of FIG. 4. And the side flap 22 may be adhered to the underlying side flap 21 along a line or band as indicated by the dotted line 46 in FIG. 4. Similarly, at the bottom closure as shown, the overlapping side flaps may be adhered together by lines or bands of adhesive at the areas indicated by the dotted lines 47, 48 and 49. At lines 47 and 48 the side flaps would not only be adhered together but also adhered to the corner flaps thereunder if there are to be no valves at this end closure.

In case the side flaps are to be adhered by heat sealing, expedients may be followed as described below in connection with FIGS. 6, 7a and 7b. That is, assuming that the top end closure is to have a valve at corner flap 24, then a plate member 50 is placed over this corner flap as shown, and in a position whereby its end will extend in under corner flap 23. This plate may be a thermal insulation plate, in case the heat sealing is to be accomplished by the use of heated bars or the like; or in case the heating is to be accomplished dielectrically by the use of high frequency current, this plate may be conductive and grounded. In either case, the plate will serve to prevent the corner flap 23 from being heat sealed to the bag portions thereunder at the time when heat sealing is being accomplished along lines such as at 45 and 46 of FIG. 4.

In case of heat sealing of the side flaps, for example at the bottom end closure of the bag where there is to be no valve, then the inner end portions as at 51, 52 of the corners 23', 24' may be folded over outwardly. This should be done before the marginal sides of the corner flaps (as at $x$ in FIG. 3) are sealed in place. Now as shown in FIG. 7b, plate members as at 54, 55 may be positioned above the corner flaps 23' and 24' respectively, these plates having their inner end portions positioned in under the folded over parts 51, 52, as shown. These plates being similar in function to the plate 50, as above described, they will serve to insulate or protect the undersides of the corner flaps 23', 24' from being heat sealed to the bag portions thereunder at the time when heat sealing is accomplished (such as along lines 47, 48, 49, FIG. 4) for sealing the side flaps 21', 22' together in superposed relation and to the folded-over portions 51, 52 of the corner flaps. In this way, the end closure may be completely heat sealed and the several flaps heat sealed to each other along desired lines or bands, without danger of heat sealing the end closure portions of the bag to the underlying main wall portions of the plastic tube. In case an end closure such as in FIG. 7a is to be provided with valves at each corner, then the corner flaps may both be provided with folded over portions as at 51, 52 and a plate as at 56 may be provided to extend entirely across the end closure above the corner flaps so that thereafter the side flaps 21, 22 may be folded over in superposed relationship and heat sealed to each other without heat sealing same to the corner flap portions thereunder, thereby leaving valve openings beneath the ends of the superposed corner flaps.

Under certain circumstances, it may also be possible to insulate various of the layers against becoming heat sealed together where not desired, by covering same with powders such as talcum, asbestos or the like.

Another form of the invention shown in FIGS. 8 and 9 is similar to that above described in connection with FIGS. 1-6, 7a and 7b, except that the construction of FIGS. 8 and 9 differs in that the slits as at 60, 61 extend far enough to meet the base fold line 62 so that, as is apparent from FIG. 9, the corner flaps 63, 64 will not have any side marginal portions such as at x, as described above in connection with FIG. 3. Yet the side flaps as at 65, 66 may be folded over in superposed relation and sealed in a manner similar to the sealing of the side flaps of the embodiment previously described. In this embodiment, the heat marking lines, such as above described, may advantageously be formed to extend throughout the length of the base fold lines 62.

Figure 10:
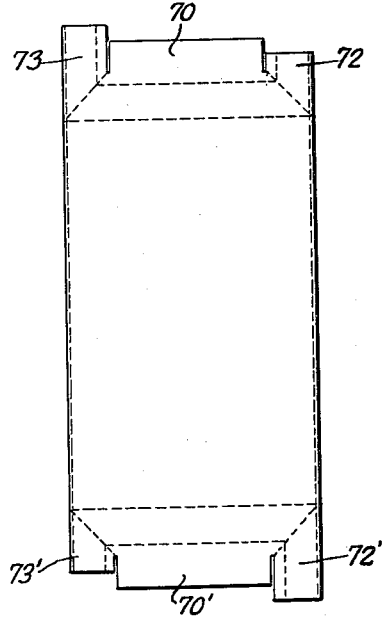
FIGS. 10 and 11 are also views somewhat similar to FIGS. 2 and 3 but illustrating a further embodiment.
Figure 11:
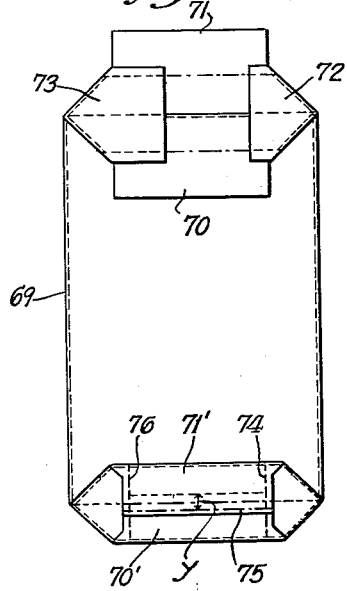

In a further embodiment of the invention, as shown in FIGS. 10 and 11, a bag blank is so profiled in forming same that the side flaps such as at 70, 71 of each end closure when folded into closing position, overlap by only a relatively narrow area, as indicated at y in FIG. 11. This may be accomplished by cutting the ends of the bag tube with a three-step profile, as shown in FIG. 10. That is, the mid-portions which are to form the side flaps are cut to an intermediate length, whereas portion 72, which is to form one of the corner flaps, is cut with an abbreviated length and the portion 73 which is to form the opposite corner flap is cut to a more extended length. The portions at the other end closure at as 70', 72', 73' are so cut as to be complementary to the upper end of the bag so that succeeding tube lengths may be cut from continuous tubing without waste of material.

As indicated at the bottom end closure of FIG. 11, the side flaps may be sealed to each other and to the corner flaps thereunder along lines or bands such as indicated by the dotted lines 74, 75 and 76 in a manner corresponding to the way in which the bottom closure of FIG. 4 is sealed along lines 47, 48 and 49. In other respects, the end closures of FIG. 11 may be closed and sealed in a manner similar to that above described in connection with FIG. 4.

Figure 12:
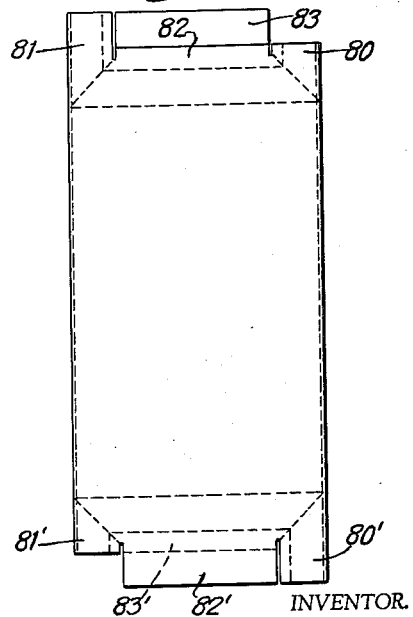

FIGS. 12 and 13 illustrate an alternative way for forming a construction similar to that of FIGS. 10 and 11. Here the corner flaps 80, 81, 80' and 81' may be like the corner flaps of the construction of FIGS. 10 and 11. However the side flaps 82 and 83 are of different lengths which are complementary respectively to the side flaps 82' and 83' at the bottom closure. As in the case of FIGS. 4 and 11, the side flaps may be adhered or heat sealed to each other and to the corner flaps beneath same where necessary along lines in under the dash lines indicated at 84, 85 and 86 in FIG. 13.

We will refer now to the further embodiment of the invention shown in FIGS. 14, 15 and 16 which differs principally from those previously described in that heat sealing of the upper and lower edge portions may be carried out on the bag element before folding the flaps. In this case, it is possible to seal the edges without using any means of limiting the heat sealing only to the layers to be heat sealed. FIG. 14 is a view showing the developed profile of the whole bag element, the ends of which may be cut straight across and the outline of which is indicated by the numerals 91, 92, 93, 94. The edge 91—94 is of course intended to be joined to or integral with the edge 92—93 when the front and back portions of the bag are folded about the dotted line 95—96 as in FIG. 15. The upper edge of the blank is formed with slits as at 97, 98 which demark the sides of the corner flap at the valve corner in the finished bag, these slits preferably extending so as to each be of a length about equal to half of the width of the end closure of the completed bag. An extension piece 100 may be advantageously adhered or otherwise secured to the upper end of the valve corner flap 99, as shown in FIG. 14.

The blank may be formed with various crease lines as shown by the dotted lines in FIGS. 14 and 15, these, if desired, being heat mark lines made as above explained in reference to heat marking lines of FIG. 3, these lines demarking the fold lines for forming the end closure portions including the diagonal lines demarking the corner flaps.

When the unit is in the condition shown in FIG. 15, the front and rear opposed upper edges may be heat sealed together straight across the unit, except at the portions forming the valve corner flap. Similarly the opposed front and back edges of the blank at the bottom may be heat sealed together. After that is done, it will be found possible to fold the top and bottom end closures in such manner that they will assume the appearance shown in FIG. 16. That is, all of the corners, except the valve corner, will be found to have what will be in effect similar to corner flaps as at 101, 102, 103 and there will be formed integrally with each, triangular free tab portions as at 104, 105 and 106. These triangular tab portions will more or less protrude from the remaining portions of the end closures of the bag and thus same may be used for readily grasping and better handling of the bag. However, if desired, these triangular portions may be cut off after heat sealing the flap portions forming same along lines such as indicated by the dotted lines 107.

What is claimed and desired to be secured by Letters Patent is:

1. A sift proof bag formed of a single walled tube of heat sealable plastic material which has an end closure comprising firstly folded in corner flaps and subsequently folded over side flaps, at least one of said folded in corner flaps having side marginal interior surfaces which overlay and are heat sealed to correspondingly facing interior surfaces of each of said side flaps said corner flaps being so heat sealed to said side flaps along heat mark lines about which said side flaps are folded over to mutually overlapping position and adhered to each other, the folded over side flaps being further adhered to at least said one corner flap along a line transverse to said heat mark lines.

2. The sift proof bag described in claim 1 wherein said heat mark lines extend continuously across the length of said side flaps between said corner flaps.

3. A sift proof bag formed of a single walled tube of heat sealable plastic material which has an end closure comprising firstly folded in corner flaps and subsequently folded over side flaps, at least one of said folded in corner flaps having side marginal interior surfaces which overlay and are heat sealed to correspondingly facing interior surfaces of each of said side flaps said corner flaps being so heat sealed to said side flaps along heat mark lines about which said side flaps are folded over to mutually overlapping position and adhesively adhered to each other, the folded over side flaps being further adhesively adhered to at least said one corner flap along a line transverse to said heat mark lines.

References Cited in the file of this patent

UNITED STATES PATENTS

| | | |
|---|---|---|
| 2,004,041 | Driver | June 4, 1935 |
| 2,086,735 | Neumiller | July 13, 1937 |
| 2,176,499 | Hoppe et al. | Oct. 17, 1939 |
| 2,265,075 | Knuetter | Dec. 2, 1941 |
| 2,311,248 | Poppe | Feb. 16, 1943 |
| 2,360,720 | Robinson | Oct. 17, 1944 |
| 2,830,750 | Weeks et al. | Apr. 15, 1958 |
| 2,844,846 | Kronholm | July 29, 1958 |
| 2,864,549 | Hayward et al. | Dec. 16, 1958 |
| 2,917,217 | Sisson | Dec. 15, 1959 |
| 2,997,224 | Stannard | Aug. 22, 1961 |